United States Patent Office 2,993,039
Patented July 18, 1961

2,993,039
PREPARING N-GLYCOSIDES OF ALDOSE AND KETOSE SUGARS
William Schroeder, Scotts, Mich., assignor to The Upjohn Company, Kalamazoo, Mich., a corporation of Delaware
No Drawing. Filed Nov. 6, 1959, Ser. No. 851,263
16 Claims. (Cl. 260—211.5)

This invention relates to a novel process for the preparation of N-glycosides and for the epimerisation of monosaccharides.

Hitherto the preparation of N-glycosides such as nucleosides, for example, adenosine, inosine, guanosine, and the like, has generally been accomplished by reaction of a 1-halo-polyacylated aldose with the appropriate nitrogenous base or, in the case of acidic nitrogenous compounds such as purines, pyrimidines, benzimidazoles, and the like, with a metal salt thereof, followed by deacylation of the resulting polyacylated N-glycoside; see, for example, the preparation of adenosine described by Davoll and Lowy, J. Am. Chem. Soc. 73, 1650 (1951). While this method has been employed in the preparation of a large number of N-glycosides it is nonetheless not of general application and so far has failed to yield nucleosides derived from a ketose and a pyrimidine base. Such nucleosides have not been described hitherto.

It is to be noted that in the above-described synthesis of N-glycosides, the monosaccharide moiety present in the resulting N-glycoside is the same, i.e., has the same stereochemical configuration, as that of the monosaccharide derivative used as starting material in the synthesis. Hence, N-glycosides derived from rare monosaccharides, such as psicose and the like, have been prepared hitherto in small quantities and at great cost due to the difficulty of obtaining supplies of the requisite monosaccharides.

Recently, methods have been described in which some of the comparatively rare monosaccharides have been prepared by epimerisation of more freely available monosaccharides; see, for example, Ness and Fletcher, J. Am. Chem. Soc. 78, 4710 (1956); ibid., 80, 2007 (1958); Smith, J. Chem. Soc. 1957, 2690; Jones and Nicholson, J. Chem. Soc. 1955, 3050. However, the synthesis of N-glycosides of the comparatively rare monosaccharides by epimerisation of a more freely available monosaccharide followed by N-glycoside formation using the above-described method involves a number of complex stages and leaves much to be desired from the standpoint of economical and facile operation, particularly on a large scale.

I have now made the novel discovery that epimerisation of monosaccharides and N-glycoside formation therefrom can be accomplished in a single step.

The process of my invention consists in a method of producing N-glycosides of aldose and ketose sugars, containing from 5 to 7 carbon atoms in the sugar moiety, which comprises reacting in an inert solvent an N-glycoside-forming nitrogenous base with an acylated 5 to 7 carbon atom monosaccharide selected from the class consisting of 3-O-acylated ketoses, 2-O-acylated aldoses, and the trityl derivatives of those 3-O-acylated ketoses and 2-O-acylated aldoses which contain primary hydroxyl groups, wherein the acyl group is a sulfonacyl leaving group, whereby N-glycoside formation occurs with concurrent epimerisation of the monosaccharide.

This discovery makes possible the direct synthesis of N-glycosides of comparatively rare or expensive monosaccharides from more freely available or much less costly monosaccharides. For example, the nucleoside adenosine, which hitherto has been prepared from adenine and the monosaccharide ribose, can be prepared directly, according to the process of the invention, from adenine and the much less expensive monosaccharide, arabinose. In a further example of the advantage of my novel process, the nucleoside, 6-amino-9β-D-psicofuranosylpurine (psicofuranine), which possesses activity as an antibiotic and which could only be prepared hitherto from the rare monosaccharide, psicose, can now be prepared, using the process of the present invention, readily and directly from the freely available monosaccharide, fructose. Similar examples of the advantages of the process of my invention in the preparation of N-glycosides hitherto difficult to prepare or not previously known will be obvious to one skilled in the art.

Further the process of my invention is of general applicability in the synthesis of N-glycosides and can be employed not only in the preparation of previously known N-glycosides derived from aldoses and ketoses but can also be employed in the preparation of previously unknown N-glycosides such as the pyrimidine ketosides.

The process of the invention can also be used in the epimerisation of monosaccharides since the glycosidic bond of the N-glycoside formed in the process of the invention can be hydrolyzed, by means to be described hereinafter, to liberate the corresponding base and a monosaccharide which is the epimer of the monosaccharide employed as starting material in the process. The base liberated in said hydrolysis can be recovered and used again in the process of the invention or in the epimerisation of a monosaccharide. Hence, it is possible using the process of the invention, followed by hydrolysis of the glycosidic linkage in the resulting N-glycosides, to convert freely available sugars to their, in many cases, less readily available epimers; for example, the readily available ketose, fructose, can be converted to the hitherto rare ketose, psicose.

The terms "epimerisation" and "epimer" employed throughout the specification and claims have the significance normally attributed to them in carbohydrate chemistry. Thus, two sugars and derivatives thereof, such as acylates and the like, are termed epimers when they differ from each other only in the configuration of the groups attached to the carbon atom in the 2-position in an aldose, or the 3-position in a ketose. Illustratively, D-arabinose and D-ribose are epimers; so are D-xylose and D-lyxose, L-galactose and L-talose, D-fructose and D-psicose.

As previously pointed out, the process of my invention is of general applicability and can be employed in the synthesis of N-glycosides by the reaction of any N-glycoside-forming nitrogenous base with any 2-O-acylaldose or 3-O-acylketose wherein the acyl group is a sulfonacyl leaving group.

The N-glycoside-forming nitrogenous bases, any of which can be employed in the novel process of my invention, are a class of bases well recognized in the art and include not only the free base form of primary and secondary amines, but also the salts, particularly the alkali metal salts, of nitrogenous compounds which have an acidic N-hydrogen atom. Examples of primary and secondary amines are monoalkylamines such as methylamine, ethylamine, isopropylamine, sec-butylamine, amylamine, hexylamine, isohexylamine, octylamine, and the like; dialkylamines such as dimethylamine, N-ethyl-N-methylamine, N-methyl-N-propylamine, N-methyl-N-isobutylamine, diisopropylamine, N-ethyl-N-hexylamine, N-methyl-N-isooctylamine, and the like; monoalkenylamines such as allylamine, 2-butenylamine, 3-hexenylamine, octenylamine, and the like; dialkenylamines such as diallylamine, di-2-butenylamine, di-3-hexenylamine, and the like; cycloalkylamines such as cyclopropylamine, cyclobutylamine, cyclopentylamine, cyclohexylamine, and the like; N-alkyl-cycloalkylamines such as N-methylcyclopentylamine, N-ethylcyclopentylamine, N-propylcyclohexylamine, and the like; cycloalkenylamines such as cyclopentenylamine, cyclohexenylamine, and the like; aralkylamines such as benzylamine, phenethylamine, phenylpropylamine, benzhydrylamine, and the like; N-alkyl-N-aralkylamines such as N-methylbenzylamine, N-propylbenzylamine, N-isobutylbenzylamine, N-octylbenzylamine, N-methylphenethylamine, and the like; N-alkyl-arylamines such as N-methylaniline, N-isopropylaniline, N-hexylaniline, N-methyl-p-toluidine, N-ethyl-m-xylidine, N-methylnaphthylamine, N-methylbenzidine, N, N'-dimethylbenzidine, and the like; N-aralkyl-arylamines such as N-benzylaniline, N-phenethylaniline, N-benzhydrylaniline, and the like; arylamines such as aniline, o-, m-, and p-toluidine, o-, m-, and p-xylidine, 1-naphthylamine, 2-naphthylamine, and the like; alkanolamines such as ethanolamine, propanolamine, diethanolamine, and the like; heterocyclic secondary amines such as pyrrolidine, piperidine, piperazine, morpholine, and methyl-substituted pyrrolidines, piperidines, piperazines and morpholines, and the like; and primary and secondary amines of the above types in which one or more of the carbon atoms is substituted by inert substituents such as alkoxy, aralkoxy, aryloxy, alkenoxy, alkylmercapto, aralkylmercapto, arylmercapto, carbalkoxy, epoxy, alkylenedioxy, carboxamido, and the like.

Illustrative of the nitrogenous compounds having an acidic N-hydrogen atom, which are employed in the process of the invention in the form of their salts, more particularly as the sodium, potassium and lithium salts, are purine, pyrimidine and substituted purines and pyrimidines of the type to be discussed hereinafter; phenothiazine, and substituted phenothiazines in which the N-atom is unsubstituted such as 2-chlorophenothiazine, 2-methanesulfonylphenothiazine, 2-trifluoromethylphenothiazine, 3,7-diacetoxyphenothiazine, and the like; carbazole, tetrahydro carbazole and the C-alkyl, C-alkoxy and C-halogen substituted derivatives thereof such as 1-, 2-, and 3-methylcarbazole, 2,6-dimethylcarbazole, 1-isopropyl-4-methylcarbazole, 1-, 2-, 3-, and 4-chloro- or bromo-carbazole, 3,6,-dichlorocarbazole, 6-bromotetrahydro-carbazole, 5-, 6-, 7-, and 8-methoxytetrahydrocarbazole, and the like; cyclic imides and sulfonimides such as succinimide, phthalimide, glutarimide, saccharin, and C-substituted derivatives thereof such as $\alpha,\alpha$-dimethylsuccinimide, $\alpha$-benzyl-$\beta$-phenylsuccinimide, $\alpha$-cyclohexylsuccinimide, $\alpha,\alpha$-diphenylsuccinimide, $\alpha$-methyl-$\beta$-phenylsuccinimide, 3-bromophthalimide, 3-chlorophthalimide, 4-chlorophthalimide, 3.6-diacetamidophthalimide, 3,4-dimethoxyphthalimide, $\alpha,\gamma$-dimethylglutarimide, $\alpha,\alpha$-diphenylglutarimide, $\beta,\beta$-diphenylglutarimide, $\alpha$-ethyl-$\gamma$-methylglutarimide, $\alpha$-ethyl-$\beta$-phenoxymethylglutarimide, and the like; benzimidazole and substituted derivatives thereof such as 5-methylbenzimidazole, 5,6-dimethylbenzimidazole, 5-acetamido-6-methoxybenzimidazole, 5-acetyl-2-methylbenzimidazole, 2-amylbenzimidazole, 2-benzylbenzimidazole, 5-bromo-4,6-dichlorobenzimidazole, 6-bromo-5,7-dichlorobenzimidazole, 5,6-dichlorobenzimidazole, 2-ethylthiobenzimidazole, 4,5,6,7-tetrachlorobenzimidazole, 2-trifluoromethylbenzimidazole, and the like; sulfenamides and the corresponding sulfonamides having the formula R—$SO_2NHR'$, wherein R represents substituted or unsubstituted alkyl, aryl, aralkyl, and heterocyclic, and R' represents hydrogen or substituted or unsubstituted alkyl, aralkyl, aryl, acyl, heterocyclic, or the group —NHR", wherein R" has the same significance as R', such as $N^4$-acetylsulfanilamide, benzenesulfonamide, p-toluenesulfonamide, acetylsulfathiazole, acetylsulfadiazine, acetylsulfamerazine, acetylsulfamethazine, acetylsulfacetamide, acetylsulfamethizole, acetylsulfisoxazole, 5-acetamido-1,3,4-thiadiazole-2-sulfonamide, 6-ethoxybenzothiazole-2-sulfonamide, benzenesulfenamide, p-toluenesulfenamide, 5-acetamido - 1,3,4-thiadiazole-2-sulfenamide, 6-ethoxybenzothiazole-2-sulfenamide, acetylsulfanilylhydrazine, 1-p-acetamidobenzenesulfonyl-2-methylhydrazine, and the like.

The N-glycoside-forming nitrogenous bases discussed above are known compounds and methods for their preparation are well known in the art.

The acylated monosaccharides which are employed in the process of the invention are 3-O-acylated ketoses and 2-O-acylated aldoses wherein the acyl group is a "sulfonacyl leaving group." The term "sulfonacyl leaving group" is well recognized in the art to mean the acyl radical of a hydrocarbon sulfonic acid which is readily eliminated from the monosaccharide molecule under reaction conditions which involve a nucleophilic attack on the C-atom to which the sulfonacylated hydroxyl group is attached. Sulfonacyl leaving groups include the acyl radicals of hydrocarbon sulfonic acids such as alkylsulfonic acids, for example, methanesulfonic acid, ethanesulfonic acid, propanesulfonic acid, butanesulfonic acid, hexanesulfonic acid, and the like; aralkylsulfonic acids, for example, benzylsulfonic acid, phenethylsulfonic acid, benzhydrylsulfonic acid, and the like; and arylsufonic acids such as benzenesulfonic acid, toluenesulfonic acid, naphthalenesulfonic acid, and the like. The preferred sulfonacyl leaving groups for use in the present invention are the acyl groups of methanesulfonic acid and p-toluenesulfonic acid.

Examples of 3-O-acylketoses which can be employed in the process of the invention are the 3-O-sulfonacyl derivatives, for example, 3-O-methanesulfonyl, 3-O-p-toluenesulfonyl, and like derivatives of ketopentoses such as D- and L-xylulose, D- and L-ribulose, ketohexoses such as D- and L-psicose, D- and L-fructose, D- and L-sorbose, and D-tagatose, and ketoheptoses such as D-alloheptulose, D-sedoheptulose, D- and L-glucoheptulose, D-mannoheptulose, and L-galactoheptulose.

Examples of 2-O-acylaldoses which can be employed in the process of the invention are the 2-O-sulfonacyl derivatives, for example, 2-O-methanesulfonyl, 2-O-p-toluenesulfonyl, and like derivatives of aldopentoses such as D- and L-ribose, D- and L-arabinose, D- and L-lyxose, and D- and L-xylose, aldohexoses such as D- and L-altrose, D- and L-allose, D- and L-mannose, D- and L-glucose, D- and L-talose, D- and L-galactose, D- and L-idose, and D- and L-gulose, and aldoheptoses such as D-gluco-D-guloheptose, D-gluco-D-idoheptose, D-manno-D-galactoheptose, D-manno-D-taloheptose, D-gulo-L-galactoheptose, D-gulo-L-taloheptose, D-galacto-L-mannoheptose, and D-galacto-L-glucoheptose.

The preparation of the 3-O-acylketoses and 2-O-acylaldoses, wherein the acyl group is a sulfonacyl leaving group, can be accomplished by methods well known in the art. The preparation of the alkylsulfonyl, aralkylsulfonyl, and arylsulfonyl derivatives has been reviewed extensively by Tipson, "Advances in Carbohydrate Chemistry," vol. 8, pp. 107–140 (1953), Academic Press Inc., New York. In general it is desirable to protect the hydroxy group in the positions other than the 3-position of a ketose or the 2-position of an aldose, to treat the so-protected monosaccharide with, for example, the appropriate sulfonacyl halide in the presence of a tertiary amine such as pyridine, and then to remove the protecting groups. For example, 3-O-methanesulfonyl-D-fructose can be prepared as described by Helferich et al., Berichte, 73B, 1049 (1940) by converting D-fructose to 1,2,4,5-diisopropylidene-D-fructopyranose, treating the latter with methanesulfonyl chloride in the presence of pyridine, and hydrolyzing the 3-O-methanesulfonyl-1,2,4,5-diisopropylidene-D-fructopyranose so obtained using sulfuric acid in aqueous methanol to obtain the desired 3-O-methanesulfonyl-D-fructose.

Those 3-O-sulfonacylketoses and 2-O-sulfonacylaldoses which contain primary hydroxyl groups can also, if desired, be employed in the process of the invention in the form of their trityl derivatives. This particular aspect of the invention is discussed more fully hereinafter.

Inert solvents which can be used in the process of the invention include any solvent which is inert under the conditions of the reaction, i.e., does not enter into reaction with any of the reactants. Suitable such solvents include water, lower alkanols such as methanol, ethanol, isopropyl alcohol, and the like; glycols and ethers thereof such as ethylene glycol, diethylene glycol, ethylene glycol dimethyl ether, ethylene glycol monoethyl ether, diethylene glycol monoethyl ether, and the like; dimethyl sulfoxide, dimethylformamide, and like solvents.

Generally speaking, the above types of solvent are employed where the N-glycoside-forming nitrogenous base is one which contains an acidic N-hydrogen atom and which is employed in the form of a salt in the process of the invention. Where the N-glycoside-forming nitrogenous base is a liquid and is employed in free base form in the process of the invention, an excess of said free base can be employed to serve as reaction solvent. In such instances an inert solvent of the type mentioned above can also be employed as an auxiliary solvent if desired.

The process of the invention can be carried out in a convenient manner by mixing the reactants in solution or suspension in the inert solvent at a temperature within the range of about 0° C. to about 100° C. Preferably the reaction is carried out at a temperature within the range of about 20° C. to about 30° C. After stirring the mixture of reactants for a short period of time, generally of the order of about 1 hr., the desired product separates therefrom in the form of a solid or an oil, or can be precipitated from the reaction mixture, for example, by pouring the latter into water. The desired product so obtained can be purified by conventional methods, for example by recrystallization.

Advantageously the N-glycoside-forming nitrogenous base is present in the reaction mixture in at least equimolar proportion with respect to the 3-O-acylated ketose or 2-O-acylated aldose. Preferably the base is present in an amount which is 2 to 3 times the equimolar proportion.

Where the 3-O-acylated ketose or 2-O-acylated aldose is employed in the process of the invention in the form of its trityl derivative, the product obtained by the process of the invention will be the correspondingly tritylated nucleoside. The latter can then be treated by methods known in the art for the removal of trityl groups to yield the free N-glycoside.

Generally the trityl groups are easily removed, for example, by hydrogenolysis in the presence of a catalyst such as palladium-on-charcoal, by heating with aqueous acetic acid at a temperature within the range of about 40° C. to about 100° C., by treating with sodium in liquid ammonia, or by heating for a very short period with a methanolic solution of hydrogen chloride.

The use of the trityl derivative of the 3-O-acylated ketose or the 2-O-acylated aldose in preference to the untritylated derivative is particularly advantageous where the monosaccharide can exist in both the furanose (5-membered ring) and pyranose (6-membered ring) forms and it is desired to obtain an N-glycoside in which the monosaccharide moiety has the furanose form. In general, a 3-O-acylated ketose (other than a ketopentose) or 2-O-acylated aldose of the type described above exists as an equilibrium mixture of both furanose and pyranose forms.

The use of such a mixture in the process of the invention generally gives rise to a mixture of the corresponding N-glycoside in which the monosaccharide is present in the furanose form and the corresponding N-glycoside in which the monosaccharide is present in the pyranose form. The mixture so obtained can be separated into its component parts by means known in the art, for example, by countercurrent distribution using an appropriate solvent system. However, in the case of 3-O-acylated ketohexoses and 2-O-acylated aldopentoses, glycosides in which the monosaccharide moiety is present in the furanose form can be obtained by first tritylating the 3-O-acylated ketohexose or 2-O-acylated aldopentose and then subjecting the trityl derivatives to the process of the invention.

Whilst the process of the invention is of general application and can be employed for the preparation of any N-glycoside using any N-glycoside-forming nitrogenous base, it is especially valuable as a method of synthesizing nucleosides including both known nucleosides and novel nucleosides such as the hitherto unknown pyrimidine ketosides. More particularly the process of the invention can be employed in the preparation of nucleosides by the use therein of N-glycoside-forming purines and pyrimidines having the formulae (I), (II), and (III):

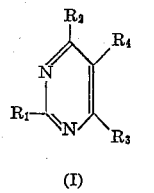 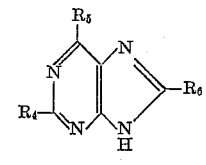

(I)       (II)

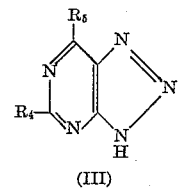

(III)

wherein one of $R_1$, $R_2$, and $R_3$ is selected from the group consisting of hydroxy and mercapto, and $R_4$, $R_5$, $R_6$, and the remainder of $R_1$, $R_2$, and $R_3$, are selected from the group consisting of hydrogen, halogen, hydroxy, mercapto, lower-alkoxy, aralkoxy, aryloxy, lower-alkyl, aralkyl, aryl, lower-alkylmercapto, aralkylmercapto, arylmercapto, and

wherein $R_7$ and $R_8$ are selected from the group consisting of hydrogen, lower-alkyl, aralkyl, and aryl.

The term "lower-alkoxy" includes alkoxy radicals such as methoxy, ethoxy, propoxy, butoxy, amyloxy, hexyloxy, octyloxy, and isomeric forms thereof. The term "aralkoxy" includes aralkoxy radicals such as benzyloxy, phenethoxy, benzhydryloxy, and the like. The term "aryloxy" includes aryloxy radicals such as phenoxy, tolyloxy, xylyloxy, naphthoxy, biphenylyloxy, and the like. The term "lower-alkyl" includes alkyl radicals such as methyl, ethyl, propyl, butyl, amyl, hexyl, heptyl, octyl, and isomeric forms thereof. The term "aralkyl" includes aralkyl radicals such as benzyl, phenethyl, benzhydryl, and the like. The term "aryl" includes aryl radicals such as phenyl, tolyl, xylyl, naphthyl, biphenylyl, and the like. The term "lower-alkylmercapto" includes alkylmercapto radicals such as methylmercapto, ethylmercapto, propylmercapto, butylmercapto, amylmercapto, hexylmercapto, heptylmercapto, octylmercapto, and isomeric forms thereof. The term "aralkylmercapto" includes aralkylmercapto radicals such as benzylmercapto, phenethylmercapto, benzhydrylmercapto, and the like. The term "arylmercapto" includes arylmercapto radicals such as phenylmercapto, tolylmercapto, xylylmercapto, naphthylmercapto, biphenylylmercapto, and the like.

When one or more of the groups $R_1$, $R_2$, $R_3$, $R_4$, $R_5$, and $R_6$ in a compound having the Formula I, II, or III, employed as reactant in the process of the invention, represents alkylmercapto, aralkylmercapto, or arylmercapto, the resulting nucleoside can be treated, for example, by catalytic desulfurisation, to remove said group or groups. The desulfurisation can be carried out in a convenient manner by refluxing the compound with Raney nickel catalyst in the presence of a neutral, nonhalogenated solvent such as methanol, ethanol, propanol, and the like.

When one or more of the groups $R_1$, $R_2$, $R_3$, $R_4$, $R_5$, and $R_6$ in a compound having the Formula I, II, or III, employed as reactant in the process of the invention, represents aralkoxy, the resulting nucleoside can be treated, for example, by hydrogenolysis, to convert said group or groups to a free hydroxyl group or groups. The hydrogenolysis can be carried out in a convenient manner by catalytic hydrogenolysis in the presence of a catalyst such as palladium-on-charcoal.

The process of the invention will now be discussed in relation to a particular embodiment thereof in order to illustrate more clearly the changes in stereochemical configuration which occur during the condensation of the acylated monosaccharide and the N-glycoside-forming nitrogenous base. It is to be understood, however, that the process of the invention is of general application and is in no way limited to the particular embodiment to be discussed at this point.

The particular embodiment to be discussed by way of illustration consists in the synthesis of 6-amino-9β-D-psicofuranosylpurine by condensation of 3-O-methanesulfonyl-D-fructose with sodium adenate. The reaction is shown schematically in the following diagram, the usual conventions being observed in regard to the representation of the spatial configurations of the groups in the fructose molecule:

D-fructose will be displaced and the β-form will be gradually converted to α-form and thence to epoxide. The furanose and pyranose forms of the fructose give rise to the corresponding furanose and pyranose forms of the epoxide. The epoxides so formed then react with the adenate and the epoxide ring is broken. In the breakdown of the epoxide ring the adenine moiety enters the 2-position of the fructose in the β-position whilst the OH group which is reformed at the 3-position is below the plane of the ring, i.e., is in epimeric relation to the OH group in the 3-position of the original fructose ring. The nucleoside so obtained contains a monosaccharide moiety which is the epimer of the monosaccharide employed as starting material, ie., the monosaccharide moiety in the resulting nucleoside is that of D-psicose.

It is to be understood that the reaction mechanism postulated above is theoretical and is not necessarily a true representation of the sequence of events taking place in the process of the invention. The postulated reaction mechanism has been set forth here only to facilitate an understanding of the stereochemical changes which occur during the process of the invention.

It will be seen from the above reaction diagram that the nucleoside obtained by condensation of sodium adenate and 3-O-methanesulfonyl-D-fructose is a mixture of 6-amino-9β-D-psicofuranosylpurine and 6-amino-9β-D-psicopyranosylpurine. If the 3-O-methanesulfonyl-D-fructose is first subjected to tritylation, using the proc-

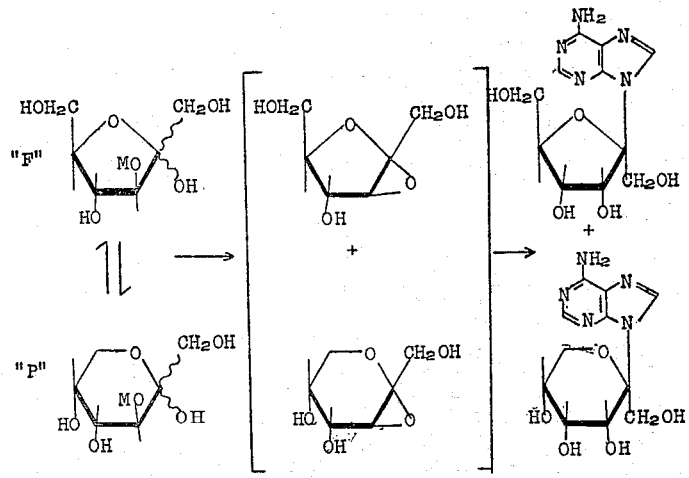

In the above formulae M represents a methanesulfonyl radical. The 3-O-methanesulfonyl-D-fructose exists as an equilibrium mixture of the furanose (F) and pyranose (P) forms and each of these forms is itself a mixture of the α- and β-forms. This latter circumstance is indicated in the above formulae "F" and "P" by the wavy lines attaching the OH and $CH_2OH$ groups in position 2. In accordance with the usual convention the α-form is that in which the OH group at position 2 is shown below the plane of the ring, and the β-form is that in which the OH group is shown above the plane of the ring. In accordance with the same convention, when the OH group in the 2-position is replaced by another substituent, the substituent is shown below the plane of the ring to indicate the α-form of the resulting fructoside and above the plane of the ring to indicate the β-form of the fructoside.

It is believed that the initial stage of the process of the invention consists in the transient formation of a 2,3-epoxide as shown in the large brackets, and it is further believed that this epoxide formation takes place exclusively in that form of the fructose in which the OH group in the 2-position and the MO group in the 3-position are in the "trans" configuration, ie., the epoxide formation occurs in the α-form of the fructose. As the α-form is converted to the epoxide, the equilibrium between the α- and β-forms in the starting 3-O-methanesulfonyless hereinbefore described, the pyranose form of the monosaccharide will be converted to the furanose form and the 1,6-di-trityl ether of 3-O-methansulfonyl-D-fructofuranose will result. The latter compound can then be reacted with sodium adenate according to the process of the invention to give exclusively the 1',6'-ditrityl ether of 6-amino-9β-D-psicofuranosylpurine, which can then be detritylated as hereinbefore described to give 6-amino-9β-D-psicofuranosylpurine. This latter method therefore affords a means of obtaining an N-glycoside in which the monosaccharide moiety is exclusively in the furanose form.

It is to be noted that, in the case of the reaction of 3-O-methanesulfonyl-D-fructose with bases such as the sodium salts of 6-methylmercaptopurine and 7-amino-γ-triazolo[d]-pyrimidine, no significant quantity is obtained of the nucleoside having the sugar moiety in the furanose form and the product is predominantly the nucleoside having the sugar moiety in the pyranose form. Also, in the reaction of sodium adenate with acylated sugars such as 2-O-methanesulfonyl-D-arabinose the resulting nucleoside (i.e., 6-amino-9β-D-ribopyranosylpurine when 2-O-methanesulfonyl-D-arabinose is employed as starting material) has the sugar moiety exclusively in the pyranose form. In such instances the nucleoside having the furanose form of the sugar moiety can be obtained by subjecting the acylated monosaccharide to tritylation before carrying out the process of the invention.

In the above-described condensation of 3-O-methanesulfonyl-D-fructose and sodium adenate, the resulting nucleoside is entirely in the β-form and no α-form is obtained. Generally speaking, it has been found that there is the following correlation between the configuration of the sugar employed as starting material and that of the glycosidic bond in the resulting N-glycoside. Where the OH groups in the 1- and 2-positions in an aldose or the 2- and 3-positions in a ketose are in the trans position in the α-form of the aldose or ketose, the glycosidic bond in the resulting N-glycoside will have the β-configuration. Conversely, where the said OH groups are in transposition in the β-form of the aldose or ketose, the glycosidic bond in the resulting nucleoside will have the α-configuration.

Many of the compounds having the Formula I, employed as starting materials in the process of the invention, are known in the art. Such compounds include uracil (2,6-dihydroxypyrimidine),
cytosine (6-amino-2-hydroxypyrimidine),
4-amino-5-benzyl-2-hydroxy,
4-amino-2-hydroxyl-5-methyl-,
4,5-diamino-6-mercapto-,
5,6-diamino-4-hydroxy-,
2,6-dihydroxy-4-dimethylamino-,
2,6-dihydroxy-4-methylamino-,
4-anilino-2-hydroxy-,
4-amylamino-2-hydroxy-,
4-benzyl-amino-2-hydroxy-,
2-hydroxy-4-methyl-6-p-toluidino-,
2,5-dihydroxy-6-phenyl-,
4,6-dihydroxy-5-benzyl-,
4,6-dihydroxy-5-isoamyl-,
4,6-dihydroxy-5-ethyl-,
2,4-dihydroxy-6-chloro-,
2,4-dihydroxy-5-fluoro-,
2-hydroxy-4-mercapto-,
2-hydroxy-5-chloro-,
4,6-dihydroxy-,
4-ethoxy-2-hydroxy-,
4,6-dihydroxy-5-methyl-,
6-hydroxy-4-methyl-,
6-hydroxy-5-methyl-,
and 6-hydroxy-4,5-dimethyl-pyrimidine.

The compounds having the Formula I can be prepared by the methods reviewed extensively in "Heterocyclic Compounds," edited by R. C. Elderfield, vol. 6, pp. 234–323, John Wiley, New York, 1957.

Many of the compounds having the Formula II above, employed as starting materials in the process of the invention, are known compounds which either occur in nature or whose preparation has been described in the literature. Thus, adenine (6-aminopurine), guanine (2-amino-6-hydroxy-purine), xanthine (2,6-dihydroxypurine), hypoxanthine (6-hydroxypurine), and uric acid (2,6,8-trihydroxypurine) occur widely in nature. Albert and Brown, J. Chem. Soc. 1954, 2060, have described the preparation of 2-methoxy-, 2-mercapto-, 2-methylmercapto-, 2,6-diamino-, 2-amino-8-phenyl-, 6-methylamino-, 6-dimethylamino-, 6-methylmercapto-, 8-phenyl-, 8-methyl-, 8-hydroxy-, 2,8-dihydroxy-, 6,8-dihydroxy-, 8-mercapto-, 8-amino-, 8-methylamino-, and 8-dimethylaminopurine. In U.S. Patent 2,705,715 there is described the condensation of 2-substituted-mercapto-4,5-diamino-6-disubstitutedamino-pyrimidines with carbon disulfide in the presence of pyridine to yield 2-methylmercapto-6-dimethylamino-8-mercaptopurine, 2-methylmercapto-6-diethylamino-8-mercaptopurine, 2-methylmercapto-6-methylanilino-8-mercaptopurine, and 2-methylmercapto-6-butylbenzylamino-8-mercaptopurine. Robbins and Christensen, J. Am. Chem. Soc. 74, 3624 (1952) described the reaction of uric acid, xanthine and hypoxanthine with phosphorus oxychloride in the presence of a tertiary aliphatic amine to yield the corresponding dialkylaminopurines and bis-dialkylaminopurines and this reaction can be applied to the preparation of the dialkyl-aminopurines having the Formula II above. The latter compounds together with the corresponding alkylaralkylamino-, diaralkylamino-diarylamino-, and alkylarylaminopurines having the Formula II above can also be prepared by reacting the corresponding mercaptopurines [2-mercapto- and 8-mercaptopurine are described by Albert and Brown (supra); 6-mercaptopurine is described in U.S. Patent 2,724,711] with the appropriate amine as described by Albert and Brown (supra). The following methods which are of general application can also be applied to the preparation of purines having the Formula II above:

(a) The compounds having the Formula II, in which $R_4$ and $R_5$ have the significance hereinbefore defined and $R_6$ represents an hydroxy group, can be prepared by acylation and cyclisation of the correspondingly substituted 4,5-diaminopyrimidine according to the method described by Traube, Berichte, 33, 3035 (1900). If the acylating agent is an aroyl chloride the corresponding 8-aryl derivatives are obtained as described by Albert and Brown (supra).

(b) The compounds having the Formula II above, in which $R_4$ and $R_5$ have the significance hereinbefore defined and $R_6$ represents a mercapto group, can be obtained by thioformylation, and subsequent cyclisation, of the appropriately substituted 4,5-diaminopyrimidines according to the procedure described by Todd et al., J. Chem. Soc. 1936, 1557. The 8-mercaptopurines so obtained can then be converted to the corresponding 8-amino-, 8-monosubstitutedamino-, and 8-disubstitutedaminopurines by reaction with ammonia or the appropriate amine according to the procedure described by Albert and Brown (supra); alternatively, the 8-mercaptopurines can be etherified by treating with an alkyl or aralkyl halide, and the resulting thioether can be subjected to hydrogenolysis as hereinbefore described to produce the corresponding 8-unsubstitutedpurines.

The compounds having the Formula III above, employed as starting materials in the process of the invention, can be prepared by diazotisation of the appropriately substituted 4,5-diaminopyrimidines according to the process described in U.S. Patent 2,407,204. Representative compounds having the Formula III which can be produced in this manner include 7-amino-, 7-hydroxy-, 5-amino-7-hydroxy-, 5,7-dihydroxy-, 7-methylmercapto-, 7-dimethylamino-, 5-ethoxy-, 5-benzyloxy-, 5-methyl-, 7-benzyl-, and 5-phenyl-γ-triazolo[d]-pyrimidine.

The nucleosides which can be prepared by the process of the invention include many known compounds in addition to the pyrimidines ketosides which are novel. The known compounds which can be prepared by the process of the invention include adenosine, psicofuranine (6-amino-9β-D-psicofuranosylpurine), inosine, guanosine, uridine, 5-fluorouridine (1β-D-ribofuranosyl-5-fluorouracil), cytidine, thymidine, and the like. In general, nucleosides play an important role in biological processes and, in addition, many of them exhibit therapeutic activity. For example, psicofuranine possesses antibacterial properties and is active in vivo against organisms such as *S. hemolyticus*. 5-fluorouridine shows activity against gram-positive bacteria such as *S. aureus* and against fungi such as *Scopulariopsis brevicaulis*. In addition, 5-fluorouridine is active as an antimetabolite and interferes with nucleic acid metabolism. For example, 5-fluorouridine inhibits the growth of organisms such as *Lactobacillus leichmannii*.

The nucleosides, both known and novel, produced by the process of the invention are also valuable as intermediates in the synthesis of the corresponding nucleotides, i.e., the nucleoside monophosphates and polyphosphates. For example, the nucleosides, adenosine, guanosine, cytidine, and uridine can be converted to the corresponding mono-phosphates, adenylic acid, guanylic acid, cytidylic acid, and uridylic acid, respectively, which latter are essential cell metabolites. Nucleosides, both known and novel are currently in great demand in the study of metabolic processes in cells. Thus said nucleosides are used in the formulation of culture media for both plant and animal tissue cells, bacteria, fungi, and culture media for viral propagation.

Similarly many of the N-glycosides, other than nucleosides, which can be produced by the process of the invention are known and possess valuable properties both as intermediates, as therapeutic agents and as research tools, for example, for the study of metabolic processes in the laboratory.

For example, the N-glycosides derived from alkylamines containing from 8 to 22 carbon atoms can be sulfated in accordance with the procedure described in U.S. Patent 2,838,487 to form sulfated N-glycosides which are useful as emulsifying agents and fabric softeners. The compound 5,6-dichloro-1-D-ribofuranosylbenzimidazole and related 5,6-dihalo compounds are antiviral agents. The ribosides of aniline, xylidine and like arylamines are useful as intermediates in the preparation by hydrogenation of the corresponding ribitylamines which themselves are useful in the synthesis of vitamin $B_2$ and related compounds as disclosed in U.S. Patent 2,384,105.

As previously mentioned, the process of the invention is also useful in the epimerisation of monosaccharides. Thus the glycosidic bond in an N-glycoside obtained according to the process of the invention can be cleaved readily, for example, by hydrolysis with an aqueous mineral acid such as sulfuric acid. There is thus obtained a mixture of the base from which the N-glycoside was derived, and a monosaccharide which is the epimer of that employed as starting material in the process of the invention. This mixture can be separated by conventional procedures and the recovered base can be used again in the process of the invention.

The following examples are illustrative of the process and products of the present invention, but are not to be construed as limiting.

EXAMPLE 1

*6-amino-9β-D-psicopyranosylpurine and 6-amino-9β-D-psicofuranocylpurine*

To a solution of 3.4 g. ((0.0132 mole) of 3-O-methanesulfonyl-D-fructose (Helferich et al., supra) in 35 ml. of absolute ethanol was added 4.4 g. (0.0276 mole) of powdered sodium adenate. The resulting slurry was stirred rapidly and almost all the solid dissolved. Almost immediately thereafter a precipitate separated and the mixture became thick with crystals. After allowing the mixture to stand overnight at approximately 20° C., the insoluble material was isolated by filtration, washed with 25 ml. of ethanol, and dried in vacuo. The material so obtained weighed 3.7 g. A sample of 2 g. of this material was then submitted to an 800-transfer countercurrent distribution in an n-butanol-water system. The combined solvent fractions containing material having a K value of 0.045 and the combined fractions having a K value of 0.17 were evaporated to dryness. The material having a K value of 0.045 was recrystallized from water. There was thus obtained 0.23 g. of 6-amino-9β-D-psicopyranosylpurine having a melting point of 155 to 160° C.; $[\alpha]_D^{27} = -174°$ ($c. = 1.33$ in dimethylformamide).

Analysis.—Calcd. for $C_{11}H_{15}N_5O_5$: C, 44.44; H, 5.09; N, 23.56. Found: C, 44.29; H, 5.17; N, 24.11.

The material having a K value of 0.17 was recrystallized from water. There was thus obtained 0.05 g. of 6-amino-9β-D-psicofuranosylpurine having a melting point of 202 to 204° C.

EXAMPLE 2

*6-amino-9β-D-psicopyranosylpurine*

A mixture of 9.2 g. (0.058 mole) of powdered sodium adenate and 100 ml. of dry dimethylformamide was stirred while a solution of 15 g. (0.058 mole) of 3-O-methanesulfonyl-D-fructose in 50 ml. of dry dimethylformamide was added dropwise during 30 minutes. The solution was stirred for an additional 2 hr. at approximately 20° C. and then added in a thin stream to 800 ml. of well-stirred ether. After the supernate had cleared it was decanted from the heavy viscous oil which had separated. The latter was washed with ether by decantation, the residual ether was allowed to evaporate, and the remaining sludge was dissolved in 25 ml. of water. The mixture was maintained at 4° C. for several hours and the solid which separated was isolated by filtration and washed successively with cold water, ethanol, and ether. The material (5.5 g.) so obtained was recrystallized from 50 ml. of water. There was thus obtained 4.4 g. of 6-amino-9β-D-psicopyranosylpurine having a melting point of 155 to 160° C., identical with the material prepared as described in Example 1.

EXAMPLE 3

*6-amino-9β-D-psicofuranosylpurine*

A mixture of 5.16 g. (0.02 mole) of 3-O-methanesulfonyl-D-fructose and 11.12 g. (0.04 mole) of freshly prepared trityl chloride in 35 ml. of dry pyridine was allowed to stand at approximately 20° C. for 4 days. The mixture was then poured into 500 ml. of water and the oil which separated was extracted with methylene chloride. The methylene chloride extract was washed with water and dried over anhydrous magnesium sulfate. The dried solution was filtered and the filtrate was treated with Darco G–60 (activated charcoal) to remove colored impurities. The solution was filtered to remove the charcoal and the filtrate was evaporated under reduced pressure. The residual glass (the 1,6-ditrityl ether of 3-O-methane sulfonyl-D-fructofuranose) was dissolved in 50 ml. of dry dimethylformamide. The solution so obtained was added dropwise to a suspension of 3.47 g. (0.022 mole) of dry sodium adenate in 100 ml. of dry dimethylformamide over a period of 30 minutes. The mixture was then stirred for 2 hr. at approximately 20° C. before being poured, with stirring, into 800 ml. of water. The solid which separated was isolated by filtration, washed with water, and dried. There was thus obtained 13.0 g. of impure 6-amino-9β-D-psicofuranosylpurine 1′,6′-ditrityl ether in the form of an amorphous powder.

A solution of 3.9 g. of the ditrityl ether so obtained in 150 ml. of liquid ammonia and 30 ml. of dry ether was stirred while 0.525 g. (0.0238 mole) of sodium metal in small pieces was added portionwise. After the blue color of the solution had been discharged, the suspension was treated with 1.0 g. of ammonium chloride added portionwise. The ammonia was then allowed to evaporate and the residue was dissolved in 50 ml. of water. The aqueous solution was extracted with ether to remove triphenylcarbinol and was then stirred for 2 hr. with 5 g. of Darco G–60. The mixture was filtered and the charcoal was washed with water and then extracted with 100 ml. of hot 90% acetone. The acetone extract was concentrated to give an aqueous phase which was lyophilized. The solid residue was recrystallized from water. There was thus obtained 0.1 g. of 6-amino-9β-D-psicofuranosylpurine having a melting point of 208 to 210° C.

In similar manner, but replacing 3-O-methanesulphonyl-D-fructose by 3-O-methanesulfonyl-D-psicose and 3-O-tolene-sulfonyl-D-sorbose, there are obtained 6-amino-9α-D-fructofuranosylpurine and 6-amino-9α-D-tagatofuranosylpurine, respectively.

EXAMPLE 4

*6-methylmercapto-9β-D-psicopyranosylpurine*

A solution of 1.67 g. (0.01 mole) of 6-methylmercaptopurine (Albert and Brown, supra) in 5 ml. (0.01 mole) of 2 N aqueous sodium hydroxide was treated with a small quantity of Darco G–60. The mixture was filtered and the filtrate was lyophilized. The solid sodium salt thus obtained was dissolved in 10 ml. of dimethylformamide and a solution of 2.58 g. (0.01 mole) of 3-O-methanesulfonyl-D-fructose in 10 ml. of dimethylformamide was added all at once. After standing for 2 hr. at approximately 20° C., the cloudy solution was poured into 200 ml. of water and the pH of the mixture was adjusted to 6.0 by the addition of acetic acid. The resulting solution was stirred with 15 g. of Darco G–60 for 2 hr. and the charcoal was collected by filtration and washed with water. The charcoal was extracted with two 75-ml. portions of hot 90% acetone. The acetone extracts were combined and evaporated in a rotating evaporator at 35° C. The residual aqueous slurry was cooled in ice for 15 minutes and the crystalline material was isolated by filtration, washed with a small amount of cold water, and dried. The material (0.98 g.) so obtained was heated with 12 ml. of water and the dense crystals which formed were isolated from the warm mixture by filtration, and recrystallized from a mixture of dimethyl sulfoxide and water. There was thus obtained 6-methylmercapto-9β-D-psicopyranosylpurine in the form of a crystalline solid having a melting point of 201 to 203° C.; $[\alpha]_D^{25} = -151°$ (c.=0.542 in dimethylsulfoxide).

*Analysis.*—Calcd. for $C_{12}H_{16}N_4O_5S$: S, 9.77. Found: S, 10.03.

In similar manner, but replacing 6-methylmercaptopurine by guanine, xanthine, hypoxanthine, uric acid, 2-methoxypurine, 2-amine-8-phenylpurine, 6-methylaminopurine, 6-dimethylaminopurine, 8-phenylpurine, 8-methylpurine, 2-methylmercapto-6-methylanilino-8-mercaptopurine, 2-methylmercapto - 6-butylbenzylamino-8-mercaptopurine, and 6-mercaptopurine, there are obtained 2-amino-6-hydroxy-, 2,6,-dihydroxy-, 6-hydroxy-, 2,6,8-trihydroxy-, 2-methoxy-, 2-amino-8-phenyl-, 6-methylamino-, 6-dimethylamino-, 8-phenyl-, 8-methyl-, 2-methylmercapto-6-methylanilino-8-mercapto-, 2-methylmercapto-6-butylbenzylamino-8-mercapto-, and 6-mercapto-9β-D-psicopyranosylpurine, respectively.

EXAMPLE 5

*7-amino-3β-D-psicopyranosyl-γ-triazolo[d]-pyrimidine*

A solution of 10.15 g. (0.0393 mole) of 3-O-methanesulfonyl-D-fructose in 50 ml. of dry dimethylformamide was added dropwise during 15 minutes to a slurry of 5 g. of the sodium salt of 7-amino-γ-triazolo[d]-pyrimidine (U.S. Patent 2,407,204) in 100 ml. of dimethylformamide. The mixture was stirred for 3 hr. at approximately 20° C. and then poured, with stirring, into 1 liter of ether. The ether was decanted from the semi-solid precipitate and the latter was dissolved in 150 ml. of water. Air was passed through the solution to remove residual ether and the solution was then treated with 20 g. of Darco G–60. The mixture was stirred for 3 hr. at approximately 20° C. and the charcoal was then collected by filtration and extracted with two 75-ml. portions of hot 90% acetone. The acetone extracts were combined and evaporated in a rotating evaporator at 35° C. The residual solid was subjected to 510 transfers in a counter-current distribution machine using an n-butanol-water solvent system. The fractions containing material having a K value of 0.23 were combined and evaporated and the residue was recrystallized from water. There was thus obtained 7-amino-3β-D-psicopyranosyl-γ-triazolo[d]-pyrimidine in the form of a crystalline solid having a melting point of 157 to 158° C.

*Analysis.*—Calcd. for $C_{10}H_{14}N_6O_5$: C, 40.27; H, 4.73; N, 28.18. Found: C, 39.60; H, 4.90; N, 28.13.

In similar maner, but replacing 7-amino-γ-triazolo[d]-pyrimidine by 7-hydroxy-, 5-amino-7-hydroxy-, 5,7-dihydroxy-, 7-methylmercapto-, 7-dimethylamino-, 5-ethoxy-, 5-benzyloxy-, 5-methyl-, 7-benzyl-, and 5-phenyl-γ-triazolo[d]-pyrimidine, there are obtained 7-hydroxy-, 5-amino-7-hydroxy-, 5,7-dihydroxy-, 7-methylmercapto-, 7-dimethylamino-, 5-ethoxy-, 5-benzyloxy-, 5-methyl-, 7-benzyl-, and 5-phenyl-3β-D-psicopyranosyl-γ-triazolo[d]-pyrimidine, respectivey.

EXAMPLE 6

*6-amino-9β-D-ribopyranosylpurine*

A stirred suspension of 2.7 g. (0.017 mole) of sodium adenate in 30 ml. of dry dimethylformamide was treated dropwise with a solution of 3.9 g. (0.017 mole) of 2-O-methanesulfonyl-D-arabinose (J. Chem. Soc. 1949, 1235) in 20 ml. of dry dimethylformamide over a period of 10 minutes. The resulting mixture was allowed to stand at approximately 20° C. for 1 hr. and then poured, with stirring, into 600 ml. of ether. The gummy solid which separated was isolated by decantation and dissolved in 50 ml. of water. The pH of the aqueous solution was adjusted to about 7.0 by the addition of acetic acid and then allowed to stand overnight at 4° C. The solid which had separated was isolated by filtration and subjected to chromatography on a Solka-Floc column. The column was eluted with aqueous ammonium hydroxide solution at pH 10 and the first fractions of eluate, containing the desired nucleoside, were freeze-dried. The solid so obtained was recrystallized from water. There was thus obtained 6-amino-9β-D-ribopyranosylpurine in the form of a crystalline solid having a melting point of 250 to 252° C.; $[\alpha]_D^{25} = -36°$ (c.=0.51 in water).

EXAMPLE 7

*6-amino-9β-D-ribofuranosylpurine (adenosine)*

A solution of 3.9 g. (0.017 mole) of 2-O-methanesulfonyl-D-arabinose in 50 ml. of dry pyridine was treated with 4.75 g. (0.017 mole) of trityl chloride. The mixture was allowed to stand for 3 days at approximately 20° C. and then poured into water. The oil which separated was extracted with methylene chloride and the methylene chloride extract was washed with water before being dried over anhydrous magnesium sulfate. The dried solution was filtered and the filtrate was evaporated. The residue (2-O-methanesulfonyl-D-arabinofuranose 5-trityl ether) was dissolved in 30 ml. of dry dimethylformamide and the solution was added dropwise to a suspension of 2.7 g. (0.017 mole) of sodium adenate in 30 ml. of dry dimethylformamide. The resulting mixture was stirred for 2 hr. at approximately 20° C. and then poured into water. The solid which separated was isolated by filtration, washed with water, and then heated for 30 minutes with 40 ml. of 80% aqueous acetic acid. The resulting mixture was cooled and the triphenylcarbinol which had separated was isolated by filtration. The filtrate was evaporated to dryness under reduced pressure and the residue was dissolved in a small quantity of hot water. The hot solution was filtered and the filtrate was allowed to cool. The solid which separated was isolated by filtration and dried. There was thus obtained 6-amino-9β-D-ribofuranosylpurine (adenosine) in the form of a crystalline solid having a melting point of 233 to 235° C.; $[\alpha]_D^{25} = -62°$ (c.=0.5 in water).

In similar manner, but replacing sodium adenate by the sodium salts of guanine, cytosine, uracil, and 5-fluorouracil, there are obtained 2-amino-6-hydroxy-9β-D-ribofuranosylpurine (guanosine), cytosine 1β-D-ribofuranoside (cytidine), uracil-1β-D-ribofuranoside (uridine), and 5-fluorouracil-1β-D-ribofuranoside, respectively.

EXAMPLE 8

*Cytosine 1β-psicofuranoside*

A suspension of 2.66 g. (0.02 mole) of the sodium salt of cytosine in 25 ml. of dimethylformamide was treated, all at once, with a solution of 14.8 g. (0.02 mole) of ditrityl 3-O-methanesulfonyl-D-fructofuranose (prepared as described in Example 3) in 50 ml. of dimethylformamide. The resulting solution was allowed to stand at approximately 20° C. for 3 hr. The mixture so obtained was then poured into 500 ml. of water and the oil which separated was extracted with a mixture of ethyl acetate and methyl ethyl ketone. The extract was washed with water and dried over anhydrous magnesium sulfate. The dried solution was filtered and the filtrate was evaporated under reduced pressure. The residual yellow glass (cytosine 1β-D-psicofuranoside 1',6'-ditrityl ether) was dissolved in dilute methanolic hydrogen chloride and the solution was warmed on the steam bath for several minutes. Silver carbonate was added to neutralize the excess acid and the mixture was filtered. The filtrate was evaporated to dryness and the residue was extracted with a mixture of ether and water. The aqueous phase was separated and lyophilized. The material so obtained was recrystallized from a mixture of ethanol and water. There was thus obtained cytosine 1β-D-psicofuranoside in the form of a crystalline solid having a melting point of 202 to 203° C.

In similar manner, but replacing the sodium salt of cytosine by the sodium salts of 4-methyl-6-hydroxy-, 4,6-dihydroxy-, 4-hydroxy-5,6-diamino-, 4-dimethylamino-2,6-dihydroxy-, 4-anilino-2-hydroxy-, 4-benzylamino-2-hydroxy-, 2-hydroxy-5-chloro-, 4-mercapto-2-hydroxy-, 2,4-dihydroxy-6-chloro-, 4-amino-5 - benzyl - 2 - hydroxy-, 4-amino-2-hydroxy-5-methyl, and 4,5-diamino-6-mercaptopyrimidine, there are obtained the corresponding β-D-psicofuranosides thereof.

EXAMPLE 9

Piperidine N-D-ribofuranoside

A mixture of 8.5 g. (0.1 mole) of piperidine and 2-O-methanesulfonyl-D-arabinofuranose 5-trityl ether [prepared from 2.3 g. (0.01 mole) of 2-O-methanesulfonyl-D-arabinose using the procedure described in Example 7] was stirred for 2 hr. at approximately 50° C. and was then poured into water. The oil which separated was extracted with methylene chloride and the methylene chloride extract was washed with water before being dried over anhydrous sodium sulfate. The dried extract was filtered and the filtrate was evaporated to dryness. The residue was then dissolved in methanol and hydrogenated at 50 p.s.i. using palladium-on-charcoal catalyst. The catalyst was removed by filtration and the filtrate was evaporated to dryness under reduced pressure. The residue was extracted with ether to remove triphenylcarbinol and then crystallized from ethanol. There was thus obtained piperidine N-D-ribofuranoside in the form of a crystalline solid.

EXAMPLE 10 p-toluidine N-D-ribofuranoside

Using the procedure described in Example 9, but substituting p-toluidine for piperidine, there was obtained p-toluidine N-D-ribofuranoside in the form of a crystalline solid.

EXAMPLE 11 p-phenetidine N-D-ribofuranoside

Using the procedure described in Example 9, but substituting p-phenetidine for piperidine, there was obtained p-phenetidine N-D-ribofuranoside in the form of a crystaline solid.

EXAMPLE 12

2-naphthylamine N-D-ribofuranoside

Using the procedure described in Example 9, but substituting 2-naphthylamine for piperidine, there was obtained 2-naphthylamine N-D-ribofuranoside in the form of a crystalline solid.

EXAMPLE 13

Piperidine N-D-psicoside

A mixture of 8.5 g. (0.1 mole) of piperidine and 2.58 g. (0.01 mole) of 3-O-methanesulfonyl-D-fructose was stirred for 2 hr. at approximately 50° C. The mixture so obtained was evaporated to dryness. The residue was crystallized from ethanol. There was thus obtained piperidine N-D-psicoside.

In similar manner, but replacing 3-O-methanesulfonyl-D-fructose by 3-O-methanesulfonyl-D-sorbose, 3-O-methanesulfonyl-D-mannose, and 3-O-methanesulfonyl-D-glucose, there were obtained piperidine N-D-tagatoside, piperidine N-D-glucoside, and piperidine N-D-mannoside, respectively.

EXAMPLE 14

Phthalimide N-D-riboside

A solution of 1.47 g. (0.01 mole) of phthalimide in 25 ml. of ethanol was treated, slowly with cooling, with a solution of 0.23 g. (0.01 mole) of sodium in 20 ml. of ethanol. The resulting solution was added slowly with stirring to a solution of 2.3 g. (0.01 mole) of 2-O-methanesulfonyl-D-arabinose in 25 ml. of ethanol. The mixture so obtained was stirred for 2 hr. at approximately 20° C. and then evaporated to dryness. The solid was fractionally crystallized from ethanol. There was thus obtained phthalimide N-D-riboside in the form of a crystalline solid.

EXAMPLE 15

5,6-dimethylbenzimidazole N-D-ribofuranoside

A solution of 1.46 g. (0.01 mole) of 5,6-dimethylbenzimidazole in 25 ml. of ethanol was treated, slowly with stirring and cooling, with a solution of 0.23 g. (0.01 mole) of sodium in 20 ml. of ethanol. The resulting solution was added slowly with stirring to a suspension of 2-O-methanesulfonyl-D-arabinose 5-trityl ether [prepared from 2.3 g. (0.01 mole) of 2-O-methanesulfonyl-D-arabinose using the procedure described in Example 7] in 25 ml. of ethanol. The resulting mixture was stirred for a further 2 hr. at approximately 20° C. and then poured into water. The solid which separated was isolated by filtration, washed with water, and dried. The dry solid was dissolved in 200 ml. of methanol and shaken with 1 g. of 5% palladium-on-charcoal catalyst in the presence of hydrogen at an initial pressure of 40 p.s.i. When the theoretical quantity of hydrogen had been taken up the mixture was filtered and the filtrate was evaporated to dryness. The residue was dissolved in water, the pH of the solution was adjusted to 9.0 by the addition of dilute sodium hydroxide, and the solution was extracted with chloroform. The solid which separated was isolated by filtration and recrystallized from water. There was thus obtained 5,6-dimethylbenzimidazole N-D-ribofuranoside in the form of a crystalline solid.

EXAMPLE 16

Cyclohexylamine N-D-ribofuranoside

Using the procedure described in Example 9, but substituting cyclohexylamine for piperidine, there was obtained cyclohexylamine N-D-ribofuranoside as a crystalline solid.

EXAMPLE 17

Isobutylamine N-D-ribofuranoside

Using the procedure described in Example 9, but substituting isobutylamine for piperidine, there was obtained isobutylamine N-D-ribofuranoside.

EXAMPLE 18

Morpholine N-D-ribofuranoside

Using the procedure described in Example 9, but substituting morpholine for piperidine, there was obtained morpholine N-D-ribofuranoside.

EXAMPLE 19

*Benzylamine N-D-ribofuranoside*

Using the procedure described in Example 9, but substituting benzylamine for piperidine, there was obtained benzylamine N-D-ribofuranoside.

EXAMPLE 20

*D-psicose from 6-amino-9β-D-psicofuranosylpurine*

A solution of 21 g. of 6-amino-9β-D-psicofuranosylpurine in 245 ml. of water containing 7 ml. of concentrated sulfuric acid, was allowed to stand overnight at 10° C. The adenine sulfate which had separated was collected by filtration and the filtrate neutralized by the addition of barium carbonate. The precipitate which separated was then removed by filtration and the clear filtrate evaporated to a thick sirup on a rotating evaporator. The sirup was dissolved in ethanol and the solution was evaporated to obtain 10.3 g. of D-psicose as a heavy sirup; $[\alpha]_D^{24} = +2.8°$ (c.=5 in water).

I claim:

1. A process for producing N-glycosides of aldose and ketose sugars containing from 5 to 7 carbon atoms in the sugar moiety which comprises reacting in an inert solvent an N-glycoside-forming nitrogenous base with an acylated 5 to 7 carbon atom monosaccharide selected from the class consisting of 3-O-acylated ketoses, 2-O-acylated aldoses, and the trityl derivatives of those 3-O-acylated ketoses and 2-O-acylated aldoses which contain primary hydroxyl groups, wherein the acyl group is a sulfonacyl leaving group, whereby N-glycoside formation occurs with concurrent epimerisation of the monosaccharide.

2. The process of claim 1 wherein the sulfonacyl leaving group is methanesulfonyl.

3. The process of claim 1 wherein the sulfonacyl leaving group is p-toluenesulfonyl.

4. The process of claim 1 wherein the N-glycoside-forming nitrogenous base is an N-glycoside-forming amine in free base form.

5. The process of claim 1 wherein the N-glycoside-forming nitrogenous base is an alkali metal salt of a nitrogenous base having an acidic N-hydrogen atom.

6. The process which comprises reacting at a temperature within the range of about 0° C. to about 100° C. an alkali metal salt of a heterocyclic compound selected from the group consisting of compounds having the formulae:

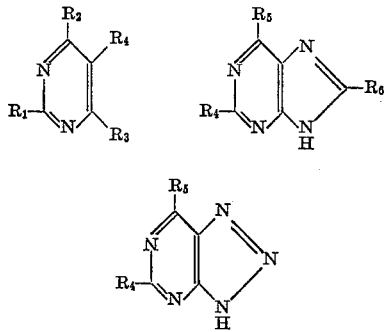

wherein one of $R_1$, $R_2$, and $R_3$ is selected from the group consisting of hydroxy and mercapto, and $R_4$, $R_5$, $R_6$ and the remainder of $R_1$, $R_2$, and $R_3$ are selected from the group consisting of hydrogen, halogen, hydroxy, mercapto, lower-alkoxy, aralkoxy, aryloxy, lower-alkyl, aralkyl, aryl, lower-alkylmercapto, aralkylmercapto, arylmercapto, and

wherein $R_7$ and $R_8$ are selected from the group consisting of hydrogen, lower-alkyl, aralkyl, and aryl, with an acylated monosaccharide selected from the group consisting of 3-O-acylated ketoses and 2-O-acylated aldoses in which the acyl group is a sulfonacyl leaving group, in the presence of an inert solvent, whereby nucleoside formation occurs with concurrent epimerisation of the monosaccharide.

7. A process for the preparation of a nucleoside in which the monosaccharide residue is present in the furanose form, which comprises reacting at a temperature within the range of about 0° C. to about 100° C. an alkali metal salt of a heterocyclic compound selected from the group consisting of compounds having the formulae:

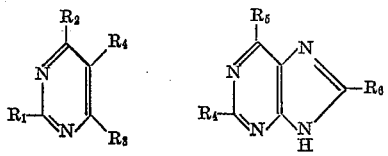

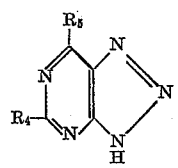

wherein one of $R_1$, $R_2$, and $R_3$ is selected from the group consisting of hydroxy and mercapto, and $R_4$, $R_5$, $R_6$ and the remainder of $R_1$, $R_2$, and $R_3$ are selected from the group consisting of hydrogen, halogen, hydroxy, mercapto, lower-alkoxy, aralkoxy, aryloxy, lower-alkyl, aralkyl, aryl, lower-alkyl mercapto, aralkylmercapto, arylmercapto, and

wherein $R_7$ and $R_8$ are selected from the group consisting of hydrogen, lower-alkyl, aralkyl, and aryl, with a monosaccharide derivative selected from the group consisting of 3-O-acylated ketopentoses, the ditrityl ethers of 3-O-acylated ketohexoses, and the monotrityl ethers of 2-O-acylated aldopentoses, in which the acyl group is a sulfonacyl leaving group, in the presence of an inert solvent, whereby nucleoside formation occurs with concurrent epimerisation of the monosaccharide, and, where the starting acylated monosaccharide is employed as a trityl ether, subjecting the nucleoside trityl ether so obtained to detritylation.

8. A process for the preparation of 6-amino-9β-D-psicofuranosylpurine which comprises reacting at a temperature within the range of about 0° C. to about 100° C. an alkali metal salt of adenine with a 3-O-acyl-D-fructofuranose 1,6-ditrityl ether, wherein the acyl group is a sulfonacyl leaving group, in the presence of an inert solvent to obtain 6-amino-9β-D-psicofuranosylpurine 1',6'-ditrityl ether, and subjecting the latter to detritylation.

9. The process of claim 8 wherein the 3-O-acyl-D-fructofuranose 1,6-ditrityl ether is 3-O-methanesulfonyl-D-fructofuranose 1,6-ditrityl ether.

10. A process for the preparation of 6-amino-9β-D-psicopyranosylpurine which comprises reacting at a temperature within the range of about 0° C. to about 100° C. and alkali metal salt of adenine with a 3-O-acyl-D-fructose wherein the acyl group is a sulfonacyl leaving group, in the presence of dimethylformamide.

11. The process of claim 10 wherein the 3-O-acyl-D-fructose is 3-O-methanesulfonyl-D-fructose.

12. A process for the preparation of adenosine which comprises reacting at a temperature within the range of about 0° C. to about 100° C. and alkali metal salt of adenine with a 2-O-acyl-D-arabinofuranose 5-trityl ether wherein the acyl group is a sulfonacyl leaving group, in the presence of an inert solvent, and detritylating the 6-amino-9β-D-ribofuranosylpurine 5'-trityl ether so obtained.

13. The process of claim 12 in which the 2-O-acyl-D-arabinofuranose 5-trityl ether is 2-O-methanesulfonyl-D-arabinofuranose 5-trityl ether.

14. The process of claim 12 in which the detritylation is accomplished by treating the 6-amino-9β-D-ribofuranosylpurine 5'-trityl ether with aqueous acetic acid at a temperature within the range of about 40° C. to about 100° C.

15. A process for the preparation of a pyrimidine ketoside which comprises reacting at a temperature within the range of about 0° C. to about 100° C. an alkali metal salt of a pyrimidine having the formula:

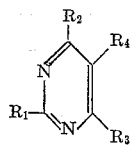

wherein one of $R_1$, $R_2$, and $R_3$ is selected from the group consisting of hydroxy and mercapto, and $R_4$ and the remainder of $R_1$, $R_2$, and $R_3$ are selected from the group consisting of hydrogen, halogen, hydroxy, mercapto, lower-alkoxy, aralkoxy, aryloxy, lower-alkyl, aralkyl, aryl, lower-alkylmercapto, aralkylmercapto, arylmercapto, and

wherein $R_7$ and $R_8$ are selected from the group consisting of hydrogen, lower-alkyl, aralkyl, and aryl, with a 3-O-acylated ketose wherein the acyl group is a sulfonacyl leaving group, in the presence of an inert solvent, whereby nucleoside formation occurs with concurrent epimerisation of the monosaccharide.

16. A process for the preparation of pyrimidine ketoside in which the ketose moiety is in the furanose form which comprises reacting at a temperature within the range of about 0° C. to about 100° C. an alkali metal salt of a pyrimidine having the formula:

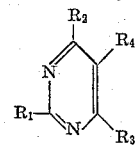

wherein one of $R_1$, $R_2$, and $R_3$ is selected from the group consisting of hydroxy and mercapto, and $R_4$ and the remainder of $R_1$, $R_2$, and $R_3$ are selected from the group consisting of hydrogen, halogen, hydroxy, mercapto, lower-alkoxy, aralkoxy, aryloxy, lower-alkyl, aralkyl, aryl, lower-alkylmercapto, aralkylmercapto, arylmercapto, and

wherein $R_7$ and $R_8$ are selected from the group consisting of hydrogen, lower-alkyl, aralkyl, and aryl, with a ketose derivative selected from the class consisting of 3-O-acylated ketopentoses and 3-O-acylated ketohexose dritrityl ethers wherein the acyl group is a sulfonacyl leaving group, in the presence of an inert solvent, whereby nucleoside formation occurs with concurrent epimerisation of the ketose, and, where the starting ketose derivative is present as a trityl ether, subjecting the pyrimidine ketoside trityl ether so obtained to detritylation.

No references cited.